TUNING APPARATUS

Filed April 17, 1947

INVENTOR.
JOHN H. ALTMANN
EDWARD W. SWANSON
BY
J. D. Douglas
ATTY.

Patented Jan. 2, 1951

2,536,409

UNITED STATES PATENT OFFICE 2,536,409

TUNING APPARATUS

John H. Altmann and Edward W. Swanson, Chicago, Ill., assignors to Admiral Corporation, Chicago, Ill., a corporation of Delaware Application April 17, 1947, Serial No. 741,970

12 Claims. (Cl. 74—10.6)

This invention relates to tuning controls for radio receivers, and particularly to a control whereby a rotary movement is converted to a rectilinear movement.

More specifically, the invention relates to the means for varying the position of one or more of the iron core elements which vary the inductance of the coils. Said means includes mechanism by which a rotary movement is converted into force acting in a straight line for actuating some tuning elements, such as permeability slugs which are adapted to be slid into and out of the coils.

The presence of lost motion and lack of stability, so prevalent in tuning apparatus of the prior art, are deficiencies which the present invention overcomes, thus providing a reliable means for tuning.

Our improved tuning mechanism includes a slug carrier adapted to support therefrom one or more permeability tuning slugs, a frame, and guide means to slidably associate the slug carrier with the frame in such a way that the slugs may be moved into and out of the inductance or inductances. The tuning mechanism further includes a pair of rotatable uniformly accelerated motion cams, rotatably carried by the frame and means for maintaining a pair of followers, on the carrier, in constant engagement with the cams. When the cams are rotated in one direction they move the carrier away from the axis of the cams consequently moving the slugs into intimate inductive relationship with the coils. When the cams are rotated in the opposite direction, the slugs are removed from the coils, the followers being held against the cams by cables anchored to the carrier and cams. The cables are adapted to be wound upon cylinders rotated with the cams, the circumference of the cylinders being substantially equal to the rise of the cams.

Other advantages of the invention will be apparent from the following specification when considered in conjunction with the accompanying drawing in which.

Figure 1:
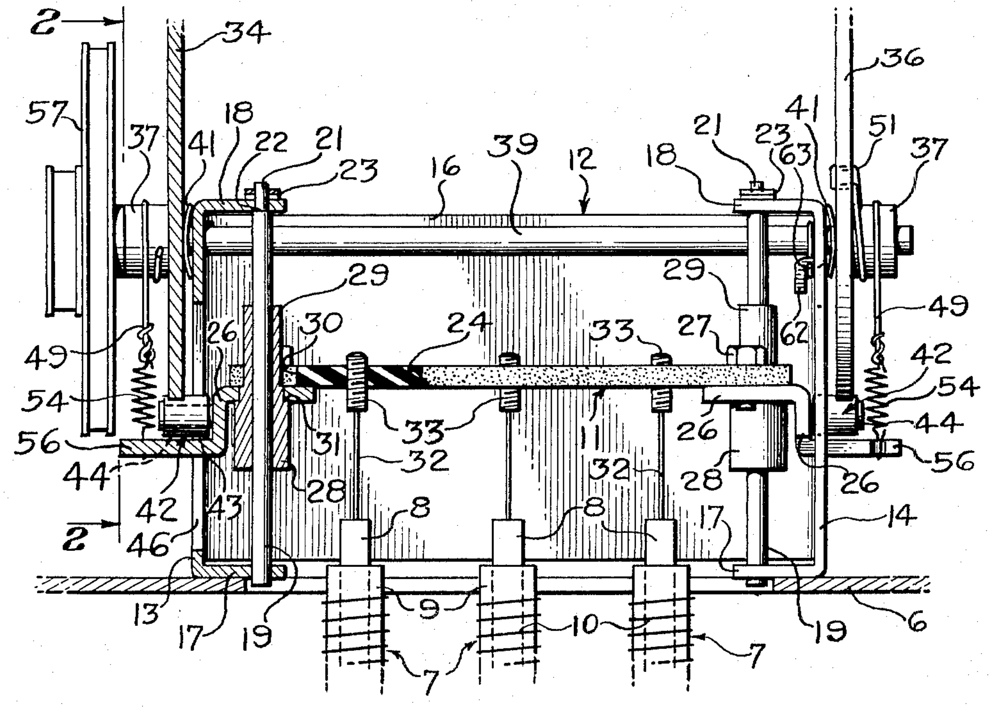
Fig. 1 is a front elevation of one embodiment of our invention, parts being broken away to reveal the structure of parts otherwise obscure.
Figure 2:
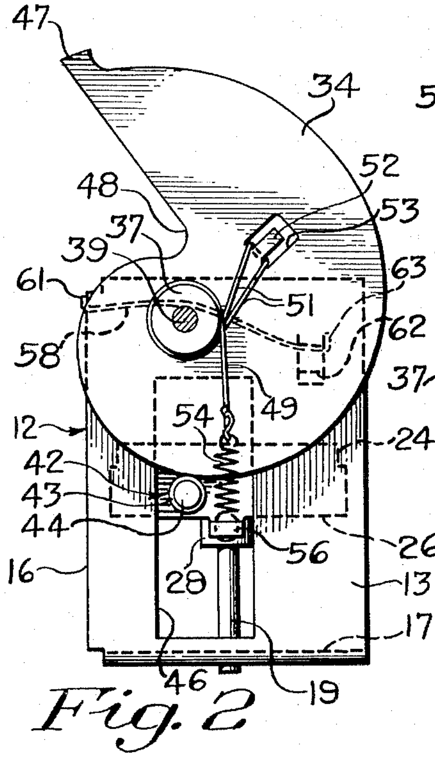
Fig. 2 is a section taken on line 2—2 of Fig. 1.
Figure 3:
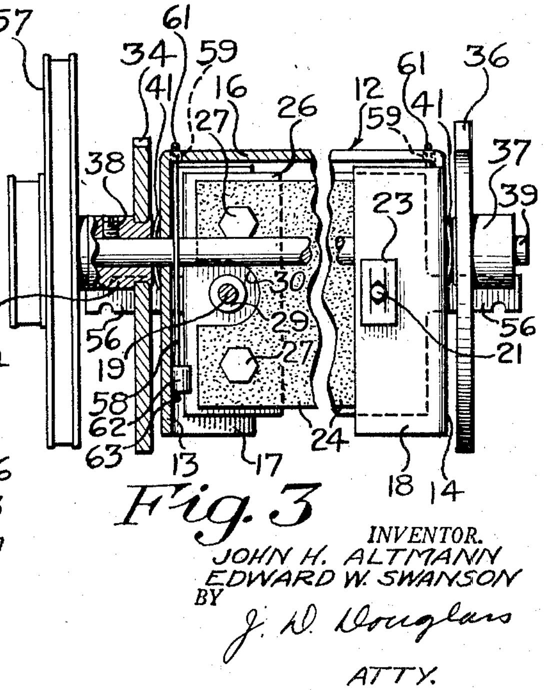
Fig. 3 is a top plan view of the mechanism, parts being broken away to reveal the structure of underlying parts, and with the cable and springs removed.

In Fig. 1, wherein for the purpose of illustration, is indicated one embodiment of the invention, the reference character 6 is used to denote stationary means of support, such as the chassis of a radio or television receiving set, for our improved tuning apparatus. The apparatus also includes one or more inductances 7, supported from the chassis by any convenient means, not shown, and conventional permeability tuning slugs 8, one of which is employed with each of the coils. Briefly, the inductances 7 are adapted to be tuned by sliding the slugs 8 within coil forms 9 on which coils proper, referred to by the character 10, are carried. The position of the slugs relative to the coils is varied by actuating means including a slug carrier 11 and stationary guide means including a frame or housing indicated in its entirety by the character 12.

In order to provide effective, yet inexpensive means to support the carrier 11 and other parts, later to be described, the support frame 12 is of box-like construction. It is preferably struck from sheet metal and has end walls 13 and 14 bent forwardly from a rear wall 16. Additionally, the walls 13 and 14 have, integral therewith, lower and upper flanges 17 and 18, extending toward each other from opposite ends of the frame. The lower flanges 17 provide feet by which the frame 12 may be bolted to the chassis 6.

In order to couple the carrier 11 to the frame 12, means including a pair of guide rods 19, are used. The rods are supported in parallel relationship to each other by the flanges 17 and 18, through which they extend. Preferably, the rods 19 are spaced from the walls 13 and 14. Additionally, an end portion 21 of each of the rods 19 is of reduced diameter to provide shoulders 22 adapted to abut flanges 18. The shoulders prevent axial displacement of the rods in one direction while suitable fastener means such as spring clips 23 grasp the ends of the rods, engage the flange 18 and thereby prevent axial displacement of the rods in the opposite direction.

The slug carrier 11 comprises a rectangular plate 24 of suitable electrically nonconductive material and at either end thereof, a pair of brackets 26, of substantially L-shaped transverse cross-section are clamped to the plate 24 by any convenient means such as screws 27, passing through the plate 24 and threaded in the bracket 26. Additionally, the slug carrier 11 includes a pair of sleeves 28, adapted to slide freely on the rods 19. In order that the sleeves may thus slidably anchor the carrier 11 to the rods, said sleeves have sections 29 of reduced cross-section which extend through the brackets 26. Shoulders 31, provided by the reduced sized section 29, are in abutment with the bracket 26, being rigidly held thereagainst in any convenient manner. The plate 24, on the other hand, is notched at 30 to provide clearance for the sections 29 of the sleeves 28.

Each of the slugs 8 is coupled to the carrier 11 by a resilient rod 32 and a screw member 33. Reference, in detail, will not be made to these parts since they are not part of the present invention, and are the subject matter of Patent No. 2,488,375 to Reuben C. Carlson.

For actuating the carrier 11, means including a pair of cams 34 and 36 are employed. They include hubs 37 through the walls of which are threaded set screws 38 by which the cams are rigidly fixed to a shaft 39, which, in turn, is journaled in the end walls 13 and 14 toward the tops thereof. Additionally, the cams are spaced slightly from the end walls 13 and 14 by resilient and normally arcuate-surfaced washers 41, each of which is adapted to urge one of the cams away from the adjacent end wall. Each of the cams is adapted to engage a cam follower 42 carried by the slug carrier 11. The cam followers include sleeves 43, rotatably supported on headed pins 44 extending outwardly from the ends of the brackets 26. Additionally, the end walls 13 and 14 have rectangular openings 46 to provide for expansion therethrough of protruding members including the followers 42.

The followers 42 afford means by which rotation of the cams 34 and 36 is limited. While at their lowest point, that is, the lowest extreme position to which the followers are adapted to be moved, the followers 42 are engaged by lugs 47 which define the limit of the high end of the cams. Approximately, 360 degrees from the stop 47 another stop surface 48 is provided at the lowest extremity of the cams. Peripherally between the stops 47 and 48, the cams 34 and 36 have uniform rise surfaces to provide for uniformity of motion of the slug carrier as the shaft 39 is rotated at a uniform speed.

Novel means are employed to provide engagement between the followers 42 and the cams 34 and 36. The means provides for constant cooperative relationship between the followers and cams regardless of the direction in which the cams are rotated. This cooperation between the cams and followers is effected by providing the hubs 37 with circumferences substantially equal to the rise of the cams, providing a cord or cable 49 for each of the hubs about which the cables are adapted to be wrapped and anchoring the cables to both cams and the slug carriers 11. This may be conveniently carried out by providing the ends of the cables with loops 51 which may be engaged by lugs 52 on the cams 34 and 36. The lugs 52 may be conveniently formed by striking a U-shaped recess 53 in the sides of the cams.

Since there must be a state of engagement between the followers 42 and the cams 34 and 36, it is desirable that pressure contact be maintained between these parts. Therefore, the forces of tension springs 54 are employed between cables 49 and carrier 11. To provide for this, each of the brackets 26 includes a notched lug 56, extending outwardly through the respective openings 46, to which the springs 48 are hooked or otherwise conveniently coupled. It will, therefore, be apparent that although the springs 54 are elongated to provide pressure contact between the followers and the cams, the springs undergo substantially no change in deflection owing to the relationship between the rise of the cams and the circumference of the hubs.

Although other means of conveying motion to the cams 34 and 36 may be employed, a convenient one is by the agency of a pulley 57 carried by the shaft 39, the pulley being adapted to receive a cable or belt indirectly coupled to the dial with which the tuner is operatively associated.

Special means is provided for avoiding lateral play of the shaft 39 within the bearings provided by the end walls 13 and 14. This is because a close fit between a journal and its bearing is not always possible when an article is manufactured on a production basis. In the present invention, as a safeguard against possible lateral motion of the shaft and consequent inaccuracy of dial reading, a resilient member 18 may take the form of a strip of normally straight wire which, at a region medially of its length, is pressed against the shaft 39 to position the shaft constantly at one side of its bearings. To effectively support the member 58, one end thereof passes through holes 59 in the rear wall 16 beyond which the ends are bent upwardly at 61, while the remaining end, caught under lugs 62 struck inwardly and downwardly from the end walls 13 and 14 terminates in upwardly extending portions 63 to prevent bodily displacement of the member 58.

By our invention, we have produced an improved apparatus which is particularly adapted to permeability tuning, especially for gang tuning. By taking advantage of the capacity of uniform rise cams, we have provided means for uniformly translating rotary motion into linear motion, and by combinatively adding the windup quality of the cam hubs, of circumference equal to the cam raise, for maintaining constant pressure between the cams and followers we gain smoothness in movement of the slugs relative to the coils that they are adapted to tune, and these features are provided by mechanism which is inexpensive of manufacture and which may be readily repaired in case of injury.

Having thus described our invention in an embodiment thereof, we are aware that numerous and extensive departures may be made therefrom without departing from the spirit or scope of the appended claims.

We claim:

1. In a permeability tuner, operating mechanism for said tuner comprising a stationary frame, guide means on said frame, a slug carrier slidably disposed on said guide means, a rotatable member pivoted on said frame having a cam surface, follower means on said carrier in engagement with said cam surface, said cam surface adapted to move said carrier away from the pivotal axis of said rotatable member upon rotation of said rotatable member and flexible means anchored between said carrier and said rotatable member to hold said carrier in engagement with said rotatable member.

2. In a permeability tuner, operating mechanism for said tuner comprising a stationary frame, guide members on said frame, a slug carrier, bearing means on said slug carrier slidably journalled on said guide members, a rotatable member pivoted to the frame having a cam surface, follower means on said carrier in engagement with said cam surface, said cam surface for moving said carrier in one direction on said guide members upon rotation of said rotatable member, and flexible means fixed between said carrier and said rotatable member adapted to move said carrier in the opposite direction and to hold said carrier in engagement with sad rotatable member.

3. In a permeability tuner, operating mechanism for said tuner comprising a stationary frame, flanges formed in said frame, guide rods fixed in parallel spaced apart relation in said flanges, a slug carrier, bearing means on said slug carrier slidably journalled on said guide rods, cam means pivoted to said frame engaging said carrier to move said carrier in one direction, flexible means anchored between said cam means and said carrier including a resilient member to move said carrier in the opposite direction and to urge said carrier into operating engagement with said cam means.

4. In a permeability tuner, operating mechanism for said tuner comprising a stationary frame having flanges thereon, guide rods fixedly mounted on said flanges in parallel spaced relation, bearing sleeves slidably journalled on said guide rods, a slug carrier member formed at least in part of insulation material carried by said sleeves, cam means pivoted to said frame, flexible means adapted to be wound around the axis of said cam means and resilient means to anchor said flexible means to said carrier to urge said carrier into engagement with said cam means.

5. Operating mechanism for a radio tuner comprising a stationary frame, guide members mounted on said frame, a slug carrier, bearing means on said slug carrier slidably journalled on said guide members, cam means pivotally mounted on said frame, follower means on said slug carrier engaging said cam means, and a resilient element to urge said follower into engagement with said cam.

6. Operating mechanism for a permeability tuner comprising a stationary frame, guide means on said frame, a slug carrier slidably disposed on said guide means, a shaft rotatably journalled in said frame, a pair of cams carried by said shaft, a pair of followers on said carrier adapted to be engaged by said cams, said cams being formed to move said carrier in a direction away from said shaft through substantially a full revolution of said cams, and resilient means to urge said followers into engagement with said cams and to move said carrier in the direction towards said shaft when the rotation of the cam is reversed.

7. Operating mechanism for a permeability tuner comprising a stationary frame, guide means mounted on said frame, a slug carrier slidably disposed on said guide means, a shaft rotatably journalled in said frame, a pair of rotary members carried by said shaft having uniform rise cam surfaces formed on substantially 360 degrees of their periphery, a pair of followers on said carrier adapted to be engaged by said cams, a pair of flexible elements and a pair of resilient elements connected together to form a pair of chain means, each of said chains fastened at one end to an end of said carrier, thence wound around the common axis of said cams and fastened at their other ends to said cams, thus adapted to be wound on said axis as the carrier moves toward said shaft and unwound from said axis as the carrier member moves away.

8. Operating mechanism for a permeability tuner comprising a stationary frame, guide means on said frame, a slug carrier slidably disposed on said guide means, a shaft rotatably journalled in said frame, a pair of cams fixed to said shaft, said cams being formed with uniform rise cam surfaces on their peripheries and stop surfaces to define the limits of said cam surfaces, a pair of followers on said carrier in engagement with said cam surfaces, said followers adapted to limit the rotation of said cams to a single revolution by engagement with said stop surfaces, hubs on said cams having a circumference substantially equal to the rise of said cams, flexible members adapted to be wound onto said hubs as said carrier is moved toward said shaft and unwound as said carrier moves away from said shaft and resilient members to anchor said flexible members to said carrier to urge said followers into engagement with said cams.

9. Operating means for a permeability tuner comprising a stationary frame, guide means mounted on said frame, a slug carrier slidably disposed on said guide means to be carried in a predetermined course thereby, bearing means in said frame, a shaft rotatably journalled in said bearings, resilient elements adapted to urge said shaft toward one side of its bearing to compensate for lateral movement of the shaft within its bearing, cam means mounted on said shaft, cam followers on said carrier and means to provide constant engagement between said cams and said followers.

10. Operating mechanism for a permeability tuner comprising a frame, a slug carrier, means slidably coupling said carrier to said frame, bearing means on said frame, a shaft rotatably journalled in said bearings, a pair of cams fixed on said shaft, cam followers on said carrier, resilient means to provide constant engagement between said cams and said followers, resilient members mounted on said frame adapted to press said shaft against a certain portion of said bearings to prevent lateral motion of said shaft in said bearings.

11. Operating mechanism for a permeability tuner comprising a stationary frame, a slug carrier slidably disposed on said frame, bearing means formed as apertures in said frame, a shaft rotatably journalled in said bearings, a pair of cams fixed on said shaft, each of said cams being formed with a cam surface of uniform rise throughout substantially 360 degrees on its periphery, a pair of cam followers on said carrier, flexible elements adapted to be coiled about the axis of said cams, spring means to anchor said flexible elements to said carrier, resilient members supported at each end by support means on said frame, said resilient members in pressure contact at a region substantially medially of their ends with said shaft to hold said shaft in a predetermined position in said bearings.

12. Operating means for a permeability tuner comprising a stationary frame having a side wall and parallel end walls extending from said side wall, pairs of parallel flanges on said end walls, guide rods supported by said flanges, each of said rods being formed with a shoulder near one end in engagement with one of said flanges, removable fastener members on said rods engaging said flanges near said shoulder to prevent axial displacement of said rods, a pair of sleeves slidably journalled on said rods, an insulating carrier member carried by said sleeves, bracket members fixed to said carrier member, a cam follower member mounted on each of said brackets, bearing means formed as an aperture in each of said end walls, a shaft rotatably journalled in said bearing means, a pair of cam means fixed on said shaft having uniform rise surfaces throughout substantially 360 degrees of their peripheral surface, a hub on each of said cams having a circumference substantially equal to the rise of said cam, a pair of cables each fixed at one end to one of said cams and wound about said hub, a spring fixed between each cable and one of said brackets to provide pressure contact between said cams and said followers, said cams adapted on rotation in one direction to move said carrier member away from said shaft and unwind said cables and on rotation in the other direction to wind up said cable and move said carrier member toward said shaft.

JOHN H. ALTMANN.
EDWARD W. SWANSON.

REFERENCES CITED

The following references are of record in the file of this patent:

UNITED STATES PATENTS

| Number | Name | Date |
|---|---|---|
| 2,144,353 | Weis | Jan. 17, 1939 |
| 2,217,984 | Kirk | Oct. 15, 1940 |
| 2,260,985 | Benton | Oct. 28, 1941 |

FOREIGN PATENTS

| Number | Country | Date |
|---|---|---|
| 299,828 | Italy | Aug. 18, 1932 |